US012759941B2

(12) United States Patent
Zhang et al.

(10) Patent No.: US 12,759,941 B2
(45) Date of Patent: Oct. 13, 2026

(54) MICROWAVE FERRITE MATERIAL FOR MINIATURIZED CIRCULATOR, AND PREPARATION METHOD THEREFOR

(71) Applicant: HENGDIAN GROUP DMEGC MAGNETICS CO., LTD, Dongyang City (CN)

(72) Inventors: Likang Zhang, Dongyang City (CN); Yuanzhen Wang, Dongyang City (CN); Feiyu Lv, Dongyang City (CN); Yi Xu, Dongyang City (CN)

(73) Assignee: HENGDIAN GROUP DMEGC MAGNETICS CO., LTD, Dongyang City (CN)

( * ) Notice: Subject to any disclaimer, the term of this patent is extended or adjusted under 35 U.S.C. 154(b) by 329 days.

(21) Appl. No.: 18/725,743

(22) PCT Filed: Aug. 4, 2022

(86) PCT No.: PCT/CN2022/110192

§ 371 (c)(1),
(2) Date: Jun. 28, 2024

(87) PCT Pub. No.: WO2023/124087

PCT Pub. Date: Jul. 6, 2023

(65) Prior Publication Data

US 2025/0059093 A1 Feb. 20, 2025

(30) Foreign Application Priority Data

Dec. 28, 2021 (CN) ......................... 202111622020.9

(51) Int. Cl.
*C04B 35/26* (2006.01)
*C04B 35/626* (2006.01)
*C04B 35/64* (2006.01)

(52) U.S. Cl.
CPC ...... *C04B 35/2608* (2013.01); *C04B 35/6261* (2013.01); *C04B 35/62625* (2013.01); *C04B 35/62655* (2013.01); *C04B 35/62695* (2013.01); *C04B 35/64* (2013.01); *C04B 2235/3208* (2013.01); *C04B 2235/3225* (2013.01); *C04B 2235/3239* (2013.01); *C04B 2235/3244* (2013.01); *C04B 2235/3272* (2013.01); *C04B 2235/602* (2013.01); *C04B 2235/606* (2013.01); *C04B 2235/658* (2013.01); *C04B 2235/764* (2013.01); *C04B 2235/77* (2013.01)

(58) Field of Classification Search
CPC ............ C04B 35/2608; C04B 35/6261; C04B 35/62625; C04B 35/62655; C04B 35/62695; C04B 35/64; C04B 2235/3208; C04B 2235/3225; C04B 2235/3239; C04B 2235/3244; C04B 2235/3272; C04B 2235/602; C04B 2235/606; C04B 2235/658; C04B 2235/764; C04B 2235/77; C04B 2235/608; C04B 35/6264; C04B 35/62685; C04B 35/63416; C04B 2235/442; C04B 2235/604; C04B 2235/6562; C04B 2235/661; C04B 35/26; H01F 1/03; H01F 1/34; H01P 1/38; H01P 1/387
See application file for complete search history.

(56) References Cited

U.S. PATENT DOCUMENTS

| | | | | |
|---|---|---|---|---|
| 6,933,799 | B1 * | 8/2005 | Nukaga .................. | H01P 1/387 333/1.1 |
| 2018/0016155 | A1 | 1/2018 | Cruickshank et al. | |

FOREIGN PATENT DOCUMENTS

| | | | |
|---|---|---|---|
| CN | 102584200 | A | 7/2012 |
| CN | 112679204 | A | 4/2021 |
| CN | 112759380 | A | 5/2021 |
| CN | 113651609 | A | 11/2021 |
| CN | 114276129 | A | 4/2022 |
| WO | 2012/042168 | A1 | 4/2012 |

OTHER PUBLICATIONS

Huang et al., "Effects of Zr-substitution on Microstructure and Properties of YCaVIG Ferrites", Journal of Magnetism and Magnetic Materials, vol. 324, No. 6, Mar. 31, 2012, pp. 934-938.

(Continued)

*Primary Examiner* — Andrew J. Oyer
(74) *Attorney, Agent, or Firm* — ArentFox Schiff LLP

(57) ABSTRACT

Disclosed are a microwave ferrite material for a miniaturized circulator, and a preparation method therefor. The microwave ferrite material has a garnet structure as a main phase, and has a chemical formula as follows: $Y_{3-a}Ca_aZr_bV_cFe_{5-b-c}O_{12}$. The preparation method comprises: mixing raw materials according to a stoichiometric ratio to obtain a raw material mixture; performing first wet ball milling on the raw material mixture to obtain a first slurry; sequentially drying and pre-sintering the first slurry to obtain first powder; performing second wet ball milling on the first powder to obtain a second slurry; sequentially drying and granulating the second slurry to obtain second powder; and sequentially forming and sintering the second powder to obtain a microwave ferrite material. Accordingly, the bandwidth of a miniaturized lumped circulator is widened so that the miniaturized lumped circulator meets 5G communication requirements; moreover, the device loss is reduced, and the communication quality is improved.

20 Claims, No Drawings

(56) References Cited

OTHER PUBLICATIONS

International Search Report and Written Opinion received for PCT Patent Application No. PCT/CN2022/110192, mailed on Oct. 25, 2022, 15 pages (8 pages of English Translation and 7 pages of Original Document).

Office Action received for Chinese Patent Application No. 202111622020.9, mailed on Jul. 19, 2022, 16 pages (7 pages of English Translation and 9 pages of Original Document).

* cited by examiner

MICROWAVE FERRITE MATERIAL FOR MINIATURIZED CIRCULATOR, AND PREPARATION METHOD THEREFOR

CROSS-REFERENCES TO RELATED APPLICATIONS

This is a National Stage Application, filed under 35 U.S.C. 371, of International Patent Application No. PCT/CN2022/110192, filed on Aug. 4, 2022, which claims priority to Chinese Patent Application No. 202111622020.9, filed with the China National Intellectual Property Administration (CNIPA) on Dec. 28, 2021, the disclosures of which are incorporated herein by reference in their entireties.

TECHNICAL FIELD

Embodiments of the present application relate to the technical field of magnetic materials, for example, a microwave ferrite material, and in particular to a microwave ferrite material for a miniaturized circulator and a preparation method therefor.

BACKGROUND 5G communication is an important part of the future information infrastructure, and the miniaturization and lightweighting target of circulators and isolators, which serve as indispensable devices for 5G communication, is particularly important. For various types of distributed-parameter junction circulators, their sizes will significantly increase with frequency decreasing, which cannot meet the requirements for use in communications, aerospace, or other systems. Lumped-parameter circulators have the feature that the size of the actual circuit is much smaller than the wavelength corresponding to their operating frequency, which can be effectively reduced in the device size, and thus becomes a research hotspot for miniaturization. However, the bandwidth of existing miniaturized lumped-parameter circulators is narrow, and none of them meets the broadband requirements of 5G communication.

In addition, the miniaturized and lightweight microwave ferrite circulators/isolators also play a role in the inter-stage isolation, interference prevention and impedance matching in the electronic system, which thereby achieve the purpose of protecting the system and improving its stability and reliability; hence, the miniaturized and lightweight microwave ferrite circulators/isolators have become the indispensable and basic devices in the microwave communication, microwave energy applications, medical treatment, microwave measurement, etc. Among them, the microwave ferrite material used in the device plays a key role.

With the rapid development of electronic technology, the market puts new requirements on the devices using microwave ferrite, and in turn put higher requirements on the microwave ferrite materials. One of the development trends of microwave ferrite materials is that the ferromagnetic resonance linewidth should be as small as possible, and the dielectric loss should be as low as possible, so as to obtain better communication quality and lower device loss.

As a result, how to provide a microwave ferrite material for miniaturized circulators and a preparation method therefor, which can broaden the bandwidth and in turn enable the miniaturized lumped circulators to meet the requirements of 5G communication, and at the same time, reduce the device loss and improve the communication quality, has become an urgent problem to be solved by those skilled in the art at present.

SUMMARY

The following is a summary of the subject matter described in detail herein. This summary is not intended to limit the protection scope of the claims.

An embodiment of the present application provides a microwave ferrite material for miniaturized circulators and a preparation method therefor; the microwave ferrite material broadens the bandwidth of the miniaturized lumped circulator, enabling it to satisfy the requirements of 5G communication, and at the same time, reduces device loss and improves communication quality.

In a first aspect, an example of the present application provides a microwave ferrite material for a miniaturized circulator, and the microwave ferrite material has a garnet structure as a main phase and a chemical formula: $Y_{3-a}Ca_aZr_bV_cFe_{5-b-c}O_{12}$, wherein: $0.07 \leq b \leq 0.08$, $0.1 \leq c \leq 0.2$, and $a=b+2c$.

In the present application, $0.07 \leq b \leq 0.08$, for example, the b may be 0.07, 0.071, 0.072, 0.073, 0.074, 0.075, 0.076, 0.077, 0.078, 0.079 or 0.08; however, the b is not limited to the listed values, and other unlisted values within the numerical range are also applicable.

In the present application, $0.1 \leq c \leq 0.2$, for example, the c may be 0.1, 0.11, 0.12, 0.13, 0.14, 0.15, 0.16, 0.17, 0.18, 0.19 or 0.2; however, the c is not limited to the listed values, and other unlisted values within the numerical range are also applicable.

The microwave ferrite material provided by the present application employs the Ca element to partly replace the Y rare earth element, and employs the Zr and V elements to partly replace the Fe ions, and uses their electromagnetic properties and compensation points to obtain the suitable saturation magnetization $4\pi Ms$, ferromagnetic resonance linewidth $\Delta H$, and Curie temperature Tc; in particular, the composite substitution of the V element gives the ferrite suitable $4\pi Ms$ and Tc, which in turn enables the device to be suitable at high and low temperature.

In a second aspect, an embodiment of the present application provides a preparation method for the microwave ferrite material according to the first aspect, and the preparation method comprises the following steps:

(1) mixing $Y_2O_3$, $CaCO_3$, $ZrO_2$, $V_2O_5$ and $Fe_2O_3$ according to a stoichiometric ratio to obtain a raw material mixture;

(2) subjecting the raw material mixture obtained from step (1) to a first wet ball milling to obtain a first slurry;

(3) drying and pre-sintering the first slurry obtained from step (2) sequentially to obtain a first powder;

(4) subjecting the first powder obtained from step (3) to a second wet ball milling to obtain a second slurry;

(5) drying and granulating the second slurry obtained from step (4) sequentially to obtain a second powder; and (6) molding and sintering the second powder obtained from step (5) sequentially to obtain the microwave ferrite material.

In the present application, the method for preparing the microwave ferrite material, i.e., the "mixing—first wet ball milling—drying and pre-sintering—second wet ball milling—drying and granulation—molding and sintering", has a stable process and good reproducibility, and is suitable for mass production.

Preferably, the $Y_2O_3$ in step (1) has a purity of more than or equal to 99.95 wt %, such as 99.95 wt %, 99.96 wt %, 99.97 wt %, 99.98 wt % or 99.99 wt %; however, the purity is not limited to the listed values, and other unlisted values within the numerical range are also applicable.

Preferably, the $CaCO_3$ in step (1) has a purity of more than or equal to 99.3 wt %, such as 99.3 wt %, 99.4 wt %, 99.5 wt %, 99.6 wt %, 99.7 wt %, 99.8 wt % or 99.9 wt %; however, the purity is not limited to the listed values, and other unlisted values within the numerical range are also applicable.

Preferably, the $ZrO_2$ in step (1) has a purity of more than or equal to 99.2 wt %, such as 99.2 wt %, 99.3 wt %, 99.4 wt %, 99.5 wt %, 99.6 wt %, 99.7 wt %, 99.8 wt % or 99.9 wt %; however, the purity is not limited to the listed values, and other unlisted values within the numerical range are also applicable.

Preferably, the $V_2O_5$ in step (1) has a purity of more than or equal to 99.2 wt %, such as 99.2 wt %, 99.3 wt %, 99.4 wt %, 99.5 wt %, 99.6 wt %, 99.7 wt %, 99.8 wt % or 99.9 wt %; however, the purity is not limited to the listed values, and other unlisted values within the numerical range are also applicable.

Preferably, the $Fe_2O_3$ in step (1) has a purity of more than or equal to 99.5 wt %, such as 99.5 wt %, 99.6 wt %, 99.7 wt %, 99.8 wt % or 99.9 wt %; however, the purity is not limited to the listed values, and other unlisted values within the numerical range are also applicable.

Preferably, the specific process of the first wet ball milling in step (2) is as follows: mixing the raw material mixture, deionized water and zirconia balls in a ball milling jar, and performing a ball milling with a dispersant added.

Preferably, the raw material mixture, deionized water and zirconia balls are mixed according to a mass ratio of 1:(0.8-1.2):(4-6), such as 1:0.8:4, 1:0.9:4, 1:1:5, 1:1.1:6 or 1:1.2:6; however, the mass ratio is not limited to the listed values, and other unlisted values within the numerical range are also applicable.

Preferably, the dispersant comprises anhydrous ethanol.

Preferably, the dispersant has an addition amount of 20-40% relative to a mass of the deionized water, such as 20%, 22%, 24%, 26%, 28%, 30%, 32%, 34%, 36%, 38% or 40%; however, the addition amount is not limited to the listed values, and other unlisted values within the numerical range are also applicable.

Preferably, the ball milling has a rotation speed of 70-80 rpm, such as 70 rpm, 71 rpm, 72 rpm, 73 rpm, 74 rpm, 75 rpm, 76 rpm, 77 rpm, 78 rpm, 79 rpm or 80 rpm; however, the rotation speed is not limited to the listed values, and other unlisted values within the numerical range are also applicable.

Preferably, the ball milling has a time of 18-22 h, such as 18 h, 18.5 h, 19 h, 19.5 h, 20 h, 20.5 h, 21 h, 21.5 h or 22 h; however, the time is not limited to the listed values, and other unlisted values within the numerical range are also applicable.

Preferably, the drying in step (3) has a temperature of 130-170° C., such as 130° C., 135° C., 140° C., 145° C., 150° C., 155° C., 160° C., 165° C. or 170° C.; however, the temperature is not limited to the listed values, and other unlisted values within the numerical range are also applicable.

Preferably, the drying in step (3) has a time of 16-24 h, such as 16 h, 17 h, 18 h, 19 h, 20 h, 21 h, 22 h, 23 h or 24 h; however, the time is not limited to the listed values, and other unlisted values within the numerical range are also applicable.

Preferably, step (3) further comprises screening the powder with a sieve of 40-80 mesh between the drying and the pre-sintering, such as 40 mesh, 50 mesh, 60 mesh, 70 mesh or 80 mesh; however, the mesh number is not limited to the listed values, and other unlisted values within the numerical range are also applicable.

Preferably, the pre-sintering in step (3) is performed in an air sintering furnace.

Preferably, the pre-sintering in step (3) has a temperature of 1100-1200° C., such as 1100° C., 1110° C., 1120° C., 1130° C., 1140° C., 1150° C., 1160° C., 1170° C., 1180° C., 1190° C. or 1200° C.; however, the temperature is not limited to the listed values, and other unlisted values within the numerical range are also applicable.

Preferably, the pre-sintering in step (3) has a heating rate of 1-3° C./min, such as 1° C./min, 1.2° C./min, 1.4° C./min, 1.6° C./min, 1.8° C./min, 2° C./min, 2.2° C./min, 2.4° C./min, 2.6° C./min, 2.8° C./min or 3° C./min; however, the heating rate is not limited to the listed values, and other unlisted values within the numerical range are also applicable.

Preferably, the pre-sintering in step (3) is carried out for a period of 6-10 h, such as 6 h, 6.5 h, 7 h, 7.5 h, 8 h, 8.5 h, 9 h, 9.5 h or 10 h; however, the time is not limited to the listed values, and other unlisted values within the numerical range are also applicable.

Preferably, the specific process of the second wet ball milling in step (4) is as follows: mixing the first powder, deionized water and zirconia balls in a ball milling jar and performing a ball milling.

Preferably, the first powder, deionized water and zirconia balls are mixed according to a mass ratio of 1:(0.8-1.2):(4-6), such as 1:0.8:4, 1:0.9:4, 1:1:5, 1:1.1:6 or 1:1.2:6; however, the mass ratio is not limited to the listed values, and other unlisted values within the numerical range are also applicable.

Preferably, the ball milling has a rotation speed of 70-80 rpm, such as 70 rpm, 71 rpm, 72 rpm, 73 rpm, 74 rpm, 75 rpm, 76 rpm, 77 rpm, 78 rpm, 79 rpm or 80 rpm; however, the rotation speed is not limited to the listed values, and other unlisted values within the numerical range are also applicable.

Preferably, the ball milling is carried out for a period of 28-36 h, such as 28 h, 29 h, 30 h, 31 h, 32 h, 33 h, 34 h, 35 h or 36 h; however, the time is not limited to the listed values, and other unlisted values within the numerical range are also applicable.

Preferably, the drying in step (5) has a temperature of 100-200° C., such as 100° C., 110° C., 120° C., 130° C., 140° C., 150° C., 160° C., 170° C., 180° C., 190° C. or 200° C.; however, the temperature is not limited to the listed values, and other unlisted values within the numerical range are also applicable.

Preferably, the drying in step (5) is carried out for a period of 15-25 h, such as 15 h, 16 h, 17 h, 18 h, 19 h, 20 h, 21 h, 22 h, 23 h, 24 h or 25 h; however, the time is not limited to the listed values, and other unlisted values within the numerical range are also applicable.

Preferably, step (5) further comprises screening the powder with a sieve of 20-60 mesh between the drying and the granulation, such as 20 mesh, 30 mesh, 40 mesh, 50 mesh or 60 mesh; however, the mesh number is not limited to the listed values, and other unlisted values within the numerical range are also applicable.

Preferably, the granulation in step (5) is performed in a spray granulator.

Preferably, a binder is added during the granulation in step (5).

Preferably, the binder comprises an aqueous solution of polyvinyl alcohol at a concentration of 9-11 wt %, such as 9 wt %, 9.2 wt %, 9.4 wt %, 9.6 wt %, 9.8 wt %, 10 wt %, 10.2 wt %, 10.4 wt %, 10.6 wt %, 10.8 wt % or 11 wt %; however, the concentration is not limited to the listed values, and other unlisted values within the numerical range are also applicable.

Preferably, the binder has an addition amount of 9-12% relative to a mass of the powder, such as 9%, 9.5%, 10%, 10.5%, 11%, 11.5% or 12%; however, the addition amount is not limited to the listed values, and other unlisted values within the numerical range are also applicable.

Preferably, step (5) further comprises screening the powder with a sieve of 60-80 mesh after the granulation, such as 60 mesh, 70 mesh or 80 mesh; however, the mesh number is not limited to the listed values, and other unlisted values within the numerical range are also applicable.

Preferably, the molding in step (6) is performed in a 100T press.

Preferably, the molding in step (6) has a molding density of 3.3-3.5 g/cm$^3$, such as 3.3 g/cm$^3$, 3.32 g/cm$^3$, 3.34 g/cm$^3$, 3.36 g/cm$^3$, 3.38 g/cm$^3$, 3.4 g/cm$^3$, 3.42 g/cm$^3$, 3.44 g/cm$^3$, 3.46 g/cm$^3$, 3.48 g/cm$^3$ or 3.5 g/cm$^3$; however, the molding density is not limited to the listed values, and other unlisted values within the numerical range are also applicable.

Preferably, the sintering in step (6) is performed in an air sintering furnace.

Preferably, the sintering in step (6) has a temperature of 1370-1410° C., such as 1370° C., 1375° C., 1380° C., 1385° C., 1390° C., 1395° C., 1400° C., 1405° C. or 1410° C.; however, the temperature is not limited to the listed values, and other unlisted values within the numerical range are also applicable.

Preferably, the sintering in step (6) has a time of 12-18 h, such as 12 h, 13 h, 14 h, 15 h, 16 h, 17 h or 18 h; however, the time is not limited to the listed values, and other unlisted values within the numerical range are also applicable.

Preferably, a heating process of the sintering in step (6) is divided into three heating stages: a first heating stage, a second heating stage and a third heating stage.

Preferably, the first heating stage has a heating rate of 1-3° C./min, such as 1° C./min, 1.2° C./min, 1.4° C./min, 1.6° C./min, 1.8° C./min, 2° C./min, 2.2° C./min, 2.4° C./min, 2.6° C./min, 2.8° C./min or 3° C./min; however, the heating rate is not limited to the listed values, and other unlisted values within the numerical range are also applicable.

Preferably, the first heating stage has an endpoint temperature of 450-550° C., such as 450° C., 460° C., 470° C., 480° C., 490° C., 500° C., 510° C., 520° C., 530° C., 540° C. or 550° C.; however, the endpoint temperature is not limited to the listed values, and other unlisted values within the numerical range are also applicable.

Preferably, the second heating stage has a heating rate of 1.5-2.5° C./min, such as 1.5° C./min, 1.6° C./min, 1.7° C./min, 1.8° C./min, 1.9° C./min, 2° C./min, 2.1° C./min, 2.2° C./min, 2.3° C./min, 2.4° C./min or 2.5° C./min; however, the heating rate is not limited to the listed values, and other unlisted values within the numerical range are also applicable.

Preferably, the second heating stage has an endpoint temperature of 800-1000° C., such as 800° C., 820° C., 840° C., 860° C., 880° C., 900° C., 920° C., 940° C., 960° C., 980° C. or 1000° C.; however, the endpoint temperature is not limited to the listed values, and other unlisted values within the numerical range are also applicable.

Preferably, the third heating stage has a heating rate of 2-2.5° C./min, such as 2° C./min, 2.1° C./min, 2.2° C./min, 2.3° C./min, 2.4° C./min or 2.5° C./min; however, the heating rate is not limited to the listed values, and other unlisted values within the numerical range are also applicable.

Preferably, the third heating stage has an endpoint temperature of 1370-1410° C., such as 1370° C., 1375° C., 1380° C., 1385° C., 1390° C., 1395° C., 1400° C., 1405° C. or 1410° C.; however, the endpoint temperature is not limited to the listed values, and other unlisted values within the numerical range are also applicable.

As a preferred technical solution of the second aspect of the present application, the preparation method comprises:

(1) mixing $Y_2O_3$ which has a purity of more than or equal to 99.95 wt %, $CaCO_3$ which has a purity of more than or equal to 99.3 wt %, $ZrO_2$ which has a purity of more than or equal to 99.2 wt %, $V_2O_5$ which has a purity of more than or equal to 99.2 wt % and $Fe_2O_3$ which has a purity of more than or equal to 99.5 wt % according to a stoichiometric ratio to obtain a raw material mixture;

(2) mixing the raw material mixture, deionized water and zirconia balls in a ball milling jar according to a mass ratio of 1:(0.8-1.2):(4-6), and performing a first wet ball milling with anhydrous ethanol added as a dispersant for 18-22 h with a rotation speed of 70-80 rpm, so as to obtain a first slurry; the anhydrous ethanol has an addition amount of 20-40% relative to a mass of the deionized water;

(3) subjecting the first slurry obtained from step (2) to drying, screening with a sieve of 40-80 mesh and pre-sintering sequentially to obtain a first powder; the drying is performed at 130-170° C. for 16-24 h; the pre-sintering is performed in an air sintering furnace by heating to 1100-1200° C. at a rate of 1-3° C./min, holding the temperature for 6-10 h, and then furnace cooling;

(4) mixing the first powder, deionized water and zirconia balls in a ball milling jar according to a mass ratio of 1:(0.8-1.2):(4-6) and performing a second wet ball milling for 28-36 h with a rotation speed of 70-80 rpm, so as to obtain a second slurry;

(5) subjecting the second slurry obtained from step (4) to drying, screening with a sieve of 40-80 mesh, granulating and screening with a sieve of 60-80 mesh sequentially to obtain a second powder; the drying is performed at 100-200° C. for 15-25 h; the granulation is performed in a spray granulator, and an aqueous solution of polyvinyl alcohol with a concentration of 9-11 wt % is added as a binder during the granulation with an addition amount of 9-12% relative to a mass of the powder; and (6) molding and sintering the second powder obtained from step (5) sequentially to obtain the microwave ferrite material; the molding is performed in a 100T press with a molding density of 3.3-3.5 g/cm$^3$; the sintering is performed in an air sintering furnace, wherein the powder is firstly heated to 450-550° C. at a rate of 1-3° C./min, then to 800-1000° C. at a rate of 1.5-2.5° C./min, and finally to 1370-1410° C. at a rate of 2-2.5° C./min, held for 12-18 h, and then cooled inside the furnace.

In a third aspect, an embodiment of the present application provides use of the microwave ferrite material according to the first aspect in a miniaturized circulator.

Compared with the related art, the present application has the following beneficial effects:

(1) the microwave ferrite material provided by embodiments of the present application employs the Ca element to partly replace the Y rare earth element, and employs the Zr and V elements to partly replace the Fe ions, and uses their electromagnetic properties and compensation points to obtain the suitable saturation magnetization 4πMs, ferromagnetic resonance linewidth ΔH, and Curie temperature Tc; in particular, the composite substitution of the V element gives the ferrite suitable 4πMs and Tc, which in turn enables the miniaturized lumped-parameter circulator that works at 758-803 MHz to have low loss, small fluctuation in the high or low temperature zone, and high communication quality, which satisfies the requirements of 5G communication; and (2) in the embodiments of the present application, the method for preparing the microwave ferrite material, i.e., the "mixing—first wet ball milling—drying and pre-sintering—second wet ball milling—drying and granulation—molding and sintering", has a stable process and good reproducibility, and is suitable for mass production.

Other aspects will be appreciated upon reading and understanding the detailed description.

DETAILED DESCRIPTION

The technical solutions of the present application are further described below in terms of specific embodiments.

Example 1

This example provides a microwave ferrite material for a miniaturized circulator and a preparation method therefor; the microwave ferrite material has a garnet structure as a main phase, and its chemical formula is $Y_{2.65}Ca_{0.35}Zr_{0.07}V_{0.14}Fe_{4.79}O_{12}$; the preparation method comprises:

(1) $Y_2O_3$ (with a purity of 99.95 wt %), $CaCO_3$ (with a purity of 99.3 wt %), $ZrO_2$ (with a purity of 99.2 wt %), $V_2O_5$ (with a purity of 99.2 wt %) and $Fe_2O_3$ (with a purity of 99.5 wt %) were mixed according to a stoichiometric ratio to obtain a raw material mixture;

(2) the raw material mixture, deionized water and zirconia balls were mixed in a ball milling jar according to a mass ratio of 1:1:5, added with anhydrous ethanol as a dispersant and subjected to a first wet ball milling for 22 h with a rotation speed of 70 rpm, so as to obtain a first slurry; the anhydrous ethanol had an addition amount of 30% relative to a mass of the deionized water;

(3) the first slurry obtained from step (2) was sequentially dried, screened with a 60-mesh sieve and pre-sintered to obtain a first powder; the drying was performed at 130° C. for 24 h; the pre-sintering was performed in an air sintering furnace by heating to 1150° C. at a rate of 2° C./min, holding the temperature for 8 h, and then furnace cooling;

(4) the first powder, deionized water and zirconia balls were mixed in a ball milling jar according to a mass ratio of 1:1:5 and subjected to a second wet ball milling for 28 h with a rotation speed of 70 rpm, so as to obtain a second slurry;

(5) the second slurry obtained from step (4) was sequentially dried, screened with a 40-mesh sieve, granulated and screened with a 80-mesh sieve to obtain a second powder; the drying was performed at 150° C. for 20 h; the granulation was performed in a spray granulator, and an aqueous solution of polyvinyl alcohol with a concentration of 9 wt % was added as a binder during the granulation with an addition amount of 12% relative to a mass of the powder; and (6) the second powder obtained from step (5) was sequentially molded and sintered to obtain the microwave ferrite material; the molding was performed in a 100T press with a molding density of 3.3 g/cm$^3$; the sintering was performed in an air sintering furnace, wherein the molded powder was firstly heated to 500° C. at a rate of 1.5° C./min, then to 900° C. at a rate of 2° C./min, and finally to 1370° C. at a rate of 2.5° C./min, held for 18 h, and then cooled inside the furnace.

Example 2

This example provides a microwave ferrite material for miniaturized a circulator and a preparation method therefor; the microwave ferrite material has a garnet structure as a main phase, and its chemical formula is $Y_{2.6}Ca_{0.4}Zr_{0.08}V_{0.16}Fe_{4.76}O_{12}$; the preparation method comprises the following steps:

(1) $Y_2O_3$ (with a purity of 99.95 wt %), $CaCO_3$ (with a purity of 99.3 wt %), $ZrO_2$ (with a purity of 99.2 wt %), $V_2O_5$ (with a purity of 99.2 wt %) and $Fe_2O_3$ (with a purity of 99.5 wt %) were mixed according to a stoichiometric ratio to obtain a raw material mixture;

(2) the raw material mixture, deionized water and zirconia balls were mixed in a ball milling jar according to a mass ratio of 1:1:5, added with anhydrous ethanol as a dispersant and subjected to a first wet ball milling for 20 h with a rotation speed of 75 rpm, so as to obtain a first slurry; the anhydrous ethanol had an addition amount of 30% relative to a mass of the deionized water;

(3) the first slurry obtained from step (2) was sequentially dried, screened with a 60-mesh sieve and pre-sintered to obtain a first powder; the drying was performed at 150° C. for 20 h; the pre-sintering was performed in an air sintering furnace by heating to 1150° C. at a rate of 2° C./min, holding the temperature for 8 h, and then furnace cooling;

(4) the first powder, deionized water and zirconia balls were mixed in a ball milling jar according to a mass ratio of 1:1:5 and subjected to a second wet ball milling for 36 h with a rotation speed of 80 rpm, so as to obtain a second slurry;

(5) the second slurry obtained from step (4) was sequentially dried, screened with a 40-mesh sieve, granulated and screened with a 80-mesh sieve to obtain a second powder; the drying was performed at 150° C. for 20 h; the granulation was performed in a spray granulator, and an aqueous solution of polyvinyl alcohol with a concentration of 10 wt % was added as a binder during the granulation with an addition amount of 10% relative to a mass of the powder; and (6) the second powder obtained from step (5) was sequentially molded and sintered to obtain the microwave ferrite material; the molding was performed in a 100T press with a molding density of 3.5 g/cm$^3$; the sintering was performed in an air sintering furnace, wherein the molded powder was firstly heated to 500° C. at a rate of 2° C./min, then to 900° C. at a rate of 2° C./min, and finally to 1390° C. at a rate of 2.5° C./min, held for 14 h, and then cooled inside the furnace.

Example 3

This example provides a microwave ferrite material for a miniaturized circulator and a preparation method therefor; the microwave ferrite material has a garnet structure as a main phase, and its chemical formula is $Y_{2.625}Ca_{0.375}Zr_{0.075}V_{0.15}Fe_{4.775}O_{12}$; the preparation method comprises:

(1) $Y_2O_3$ (with a purity of 99.95 wt %), $CaCO_3$ (with a purity of 99.3 wt %), $ZrO_2$ (with a purity of 99.2 wt %), $V_2O_5$ (with a purity of 99.2 wt %) and $Fe_2O_3$ (with a purity of 99.5 wt %) were mixed according to a stoichiometric ratio to obtain a raw material mixture;

(2) the raw material mixture, deionized water and zirconia balls were mixed in a ball milling jar according to a mass ratio of 1:1:5, added with anhydrous ethanol as a dispersant and subjected to a first wet ball milling for 18 h with a rotation speed of 80 rpm, so as to obtain a first slurry; the anhydrous ethanol had an addition amount of 30% relative to a mass of the deionized water;

(3) the first slurry obtained from step (2) was sequentially dried, screened with a 60-mesh sieve and pre-sintered to obtain a first powder; the drying was performed at 170° C. for 16 h; the pre-sintering was performed in an air sintering furnace by heating to 1150° C. at a rate of 2° C./min, holding the temperature for 8 h, and then furnace cooling;

(4) the first powder, deionized water and zirconia balls were mixed in a ball milling jar according to a mass ratio of 1:1:5 and subjected to a second wet ball milling for 30 h with a rotation speed of 70 rpm, so as to obtain a second slurry;

(5) the second slurry obtained from step (4) was sequentially dried, screened with a 40-mesh sieve, granulated and screened with a 80-mesh sieve to obtain a second powder; the drying was performed at 150° C. for 20 h; the granulation was performed in a spray granulator, and an aqueous solution of polyvinyl alcohol with a concentration of 11 wt % was added as a binder during the granulation with an addition amount of 9% relative to a mass of the powder; and (6) the second powder obtained from step (5) was sequentially molded and sintered to obtain the microwave ferrite material; the molding was performed in a 100T press with a molding density of 3.4 g/cm$^3$; the sintering was performed in an air sintering furnace, wherein the molded powder was firstly heated to 500° C. at a rate of 2° C./min, then to 900° C. at a rate of 2° C./min, and finally to 1410° C. at a rate of 2.5° C./min, held for 12 h, and then cooled inside the furnace.

Comparative Example 1

This comparative example provides a microwave ferrite material for a miniaturized circulator and a preparation method therefor; except that the chemical formula of the microwave ferrite material is replaced with $Y_{2.69}Ca_{0.31}Zr_{0.07}V_{0.12}Fe_{4.81}O_{12}$, other conditions are the same as those of Example 1, which will not be repeated herein.

Comparative Example 2

This comparative example provides a microwave ferrite material for a miniaturized circulator and a preparation method therefor; except that the chemical formula of the microwave ferrite material is replaced with $Y_{2.93}Ca_{0.07}Zr_{0.07}Fe_{4.93}O_{12}$, other conditions are the same as those of Example 1, which will not be repeated herein.

Comparative Example 3

This comparative example provides a microwave ferrite material for a miniaturized circulator and a preparation method therefor; except that the chemical formula of the microwave ferrite material is replaced with $Y_{2.72}Ca_{0.28}V_{0.14}Fe_{4.86}O_{12}$, other conditions are the same as those of Example 1, which will not be repeated herein.

Comparative Example 4

This comparative example provides a microwave ferrite material for a miniaturized circulator and a preparation method therefor; except that the chemical formula of the microwave ferrite material is replaced with $Y_{2.65}Ca_{0.35}Zr_{0.35}Fe_{4.65}O_{12}$, other conditions are the same as those of Example 1, which will not be repeated herein.

Comparative Example 5

This comparative example provides a microwave ferrite material for a miniaturized circulator and a preparation method therefor; except that the chemical formula of the microwave ferrite material is replaced with $Y_3Fe_5O_{12}$, other conditions are the same as those of Example 1, which will not be repeated herein.

The microwave ferrite materials obtained from Examples 1-3 and Comparative Examples 1-5 were subjected to the performance tests below, and the test results are shown in Table 1:

(1) testing the density ρ by the water displacement;

(2) testing the dielectric constant ε by machining the sample into a thin rod (Φ1.6 cm×22 cm);

(3) testing the ferromagnetic resonance linewidth ΔH by polishing the sample into a ball (Φ1 mm); and (4) testing the saturation magnetization 4πMs and Curie temperature Tc by machining the sample into a ball (Φ2.5 mm).

TABLE 1

| Microwave ferrite material | Density ρ (g/cm$^3$) | Dielectric constant ε | Ferromagnetic resonance linewidth ΔH (oe) | Saturation magnetization 4πMs (Gs) | Curie temperature Tc (° C.) |
|---|---|---|---|---|---|
| Example 1 | 4.83 | 14.43 | 15 | 1471 | 260 |
| Example 2 | 4.86 | 14.38 | 14 | 1386 | 255 |

TABLE 1-continued

| Microwave ferrite material | Density ρ ($g/cm^3$) | Dielectric constant ε | Ferromagnetic resonance linewidth ΔH (oe) | Saturation magnetization 4πMs (Gs) | Curie temperature Tc (° C.) |
|---|---|---|---|---|---|
| Example 3 | 4.85 | 14.40 | 14 | 1402 | 258 |
| Comparative Example 1 | 4.90 | 14.34 | 25 | 1470 | 232 |
| Comparative Example 2 | 5.07 | 14.37 | 22 | 1842 | 254 |
| Comparative Example 3 | 4.78 | 14.58 | 30 | 1435 | 268 |
| Comparative Example 4 | 4.95 | 14.73 | 20 | 1952 | 201 |
| Comparative Example 5 | 5.17 | 14.8 | 78 | 1780 | 280 |

As can be seen from Table 1, compared with those from Examples 1-3, the microwave ferrite materials obtained from Comparative Examples 1-5 have a larger ferromagnetic resonance linewidth, or a higher saturation magnetization, or a lower Curie temperature, which cannot meet the low loss requirement of the circulator, while the microwave ferrite materials obtained from Examples 1-3 have the advantages of small ferromagnetic resonance linewidth and high Curie temperature.

The microwave ferrite material obtained from Example 3 was machined into a size required by the lumped-parameter circulator, and tested for the insertion loss with a network analyzer, and the test results are shown in Table 2.

TABLE 2

| Temperature | F1 (758 Mhz) | F2 (780.5 Mhz) | F3 (803 Mhz) |
|---|---|---|---|
| −40° C. | −0.63 dB | −0.60 dB | −0.61 dB |
| 25° C. | −0.58 dB | −0.55 dB | −0.57 dB |
| 105° C. | −0.64 dB | −0.62 dB | −0.65 dB |

As can be seen from Table 2, the lumped-parameter circulator, which is prepared with the microwave ferrite material obtained from Example 3 via rational device design, has the advantages of small size, low insertion loss, and small temperature drift in the high or low temperature zone.

It can be seen that the microwave ferrite material provided by the present application employs the Ca element to partly replace the Y rare earth element, and employs the Zr and V elements to partly replace the Fe ions, and uses their electromagnetic properties and compensation points to obtain the suitable saturation magnetization 4πMs, ferromagnetic resonance linewidth ΔH, and Curie temperature Tc; in particular, the composite substitution of the V element gives the ferrite suitable 4πMs and Tc, which in turn enables the miniaturized lumped-parameter circulator that works at 758-803 MHz to have low loss, small fluctuation in the high or low temperature zone, and high communication quality, which satisfies the requirements of 5G communication; moreover, in the present application, the method for preparing the microwave ferrite material, i.e., the "mixing—first wet ball milling—drying and pre-sintering—second wet ball milling—drying and granulation—molding and sintering", has a stable process and good reproducibility, and is suitable for mass production.

The specific examples described above further elaborate the purposes, technical solutions and beneficial effects of the present application in detail. It should be understood that the above is only specific examples of the present application, and is not intended to limit the present application, and any modifications, equivalent substitutions, improvements, etc., made within the spirit and principles of the present application, shall fall within the protection scope of the present application.

What is claimed is:

1. A microwave ferrite material for a miniaturized circulator, wherein the microwave ferrite material has a garnet structure as a main phase and a chemical formula: $Y_{3-a}Ca_aZr_bV_cFe_{5-b-c}O_{12}$, wherein: 0.07≤b≤0.08, 0.1≤c≤0.2, and a=b+2c.

2. A preparation method for the microwave ferrite material according to claim 1, comprising the following steps:

(1) mixing $Y_2O_3$, $CaCO_3$, $ZrO_2$, $V_2O_5$ and $Fe_2O_3$ according to a stoichiometric ratio to obtain a raw material mixture;

(2) subjecting the raw material mixture obtained from step (1) to a first wet ball milling to obtain a first slurry;

(3) drying and pre-sintering the first slurry obtained from step (2) sequentially to obtain a first powder;

(4) subjecting the first powder obtained from step (3) to a second wet ball milling to obtain a second slurry;

(5) drying and granulating the second slurry obtained from step (4) sequentially to obtain a second powder; and (6) molding and sintering the second powder obtained from step (5) sequentially to obtain the microwave ferrite material.

3. The preparation method according to claim 2, wherein the $Y_2O_3$ in step (1) has a purity of more than or equal to 99.95 wt %;

wherein, the $CaCO_3$ in step (1) has a purity of more than or equal to 99.3 wt %;

wherein, the $ZrO_2$ in step (1) has a purity of more than or equal to 99.2 wt %;

wherein, the $V_2O_5$ in step (1) has a purity of more than or equal to 99.2 wt %; and wherein, the $Fe_2O_3$ in step (1) has a purity of more than or equal to 99.5 wt %.

4. The preparation method according to claim 2, wherein the first wet ball milling in step (2) includes a specific process of: mixing the raw material mixture, deionized water and zirconia balls in a ball milling jar, and performing a ball milling with a dispersant added.

5. The preparation method according to claim 4, wherein the raw material mixture, the deionized water and the zirconia balls are mixed according to a mass ratio of 1:(0.8-1.2):(4-6).

6. The preparation method according to claim 4, wherein the dispersant comprises anhydrous ethanol.

7. The preparation method according to claim 4, wherein the dispersant has an addition amount of 20-40% relative to a mass of the deionized water.

8. The preparation method according to claim 4, wherein the ball milling has a rotation speed of 70-80 rpm; and
wherein, the ball milling is carried out for a period of 18-22 h.

9. The preparation method according to claim 2, wherein the drying in step (3) has a temperature of 130-170° C.; and
wherein, the drying in step (3) is carried out for a period of 16-24 h.

10. The preparation method according to claim 2, wherein the second wet ball milling in step (4) includes a specific process of: mixing the first powder, deionized water and zirconia balls in a ball milling jar and performing a ball milling;
wherein, the first powder, the deionized water and the zirconia balls are mixed according to a mass ratio of 1:(0.8-1.2):(4-6);
wherein, the ball milling has a rotation speed of 70-80 rpm; and
wherein, the ball milling is carried out for a period of 28-36 h.

11. The preparation method according to claim 2, wherein the drying in step (5) has a temperature of 100-200° C.;
wherein, the drying in step (5) is carried out for a period of 15-25 h; and
wherein, the granulation in step (5) is performed in a spray granulator.

12. The preparation method according to claim 2, wherein the molding in step (6) is performed in a 100T press;
wherein, the molding in step (6) has a molding density of 3.3-3.5 g/cm$^3$; and
wherein, the sintering in step (6) is performed in an air sintering furnace.

13. The preparation method according to claim 2, wherein a heating process of the sintering in step (6) is divided into three heating stages: a first heating stage, a second heating stage and a third heating stage;
wherein, the first heating stage has a heating rate of 1-3° C./min;
wherein, the first heating stage has an endpoint temperature of 450-550° C.;
wherein, the second heating stage has a heating rate of 1.5-2.5° C./min;
wherein, the second heating stage has an endpoint temperature of 800-1000° C.;
wherein, the third heating stage has a heating rate of 2-2.5° C./min; and
wherein, the third heating stage has an endpoint temperature of 1370-1410° C.

14. The preparation method according to claim 2,
(1) the mixing in step (1) includes: mixing the $Y_2O_3$ which has a purity of more than or equal to 99.95 wt %, the $CaCO_3$ which has a purity of more than or equal to 99.3 wt %, the $ZrO_2$ which has a purity of more than or equal to 99.2 wt %, the $V_2O_5$ which has a purity of more than or equal to 99.2 wt % and the $Fe_2O_3$ which has a purity of more than or equal to 99.5 wt % according to the stoichiometric ratio to obtain the raw material mixture;
(2) the subjecting in step (2) includes: mixing the raw material mixture, deionized water and zirconia balls in a ball milling jar according to a mass ratio of 1:(0.8-1.2):(4-6), and performing the first wet ball milling with anhydrous ethanol added as a dispersant for 18-22 h with a rotation speed of 70-80 rpm, so as to obtain the first slurry; the anhydrous ethanol has an addition amount of 20-40% relative to a mass of the deionized water;
(3) the drying and pre-sintering in step (3) includes: subjecting the first slurry obtained from step (2) to drying, screening with a sieve of 40-80 mesh and pre-sintering sequentially to obtain the first powder; the drying is performed at 130-170° C. for 16-24 h; the pre-sintering is performed in an air sintering furnace by heating to 1100-1200° C. at a rate of 1-3° C./min, holding a temperature of the heating for 6-10 h, and then furnace cooling;
(4) the subjecting in step (4) includes: mixing the first powder, deionized water and zirconia balls in a ball milling jar according to a mass ratio of 1:(0.8-1.2):(4-6) and performing the second wet ball milling for 28-36 h with a rotation speed of 70-80 rpm, so as to obtain the second slurry;
(5) the drying and granulating in step (5) includes: subjecting the second slurry obtained from step (4) to drying, screening with a sieve of 40-80 mesh, granulating and screening with a sieve of 60-80 mesh sequentially to obtain the second powder; the drying is performed at 100-200° C. for 15-25 h; the granulation is performed in a spray granulator, and an aqueous solution of polyvinyl alcohol with a concentration of 9-11 wt % is added as a binder during the granulation with an addition amount of 9-12% relative to a mass of the powder; and
(6) the molding and sintering in step (6) includes: molding and sintering the second powder obtained from step (5) sequentially to obtain the microwave ferrite material; the molding is performed in a 100T press with a molding density of 3.3-3.5 g/cm$^3$; the sintering is performed in an air sintering furnace, wherein the powder is firstly heated to 450-550° C. at a rate of 1-3° C./min, then to 800-1000° C. at a rate of 1.5-2.5° C./min, and finally to 1370-1410° C. at a rate of 2-2.5° C./min, held for 12-18 h, and then cooled inside the furnace.

15. The preparation method according to claim 2, wherein step (3) further comprises screening the powder with a sieve of 40-80 mesh between the drying and the pre-sintering; and
wherein, the pre-sintering in step (3) is performed in an air sintering furnace.

16. The preparation method according to claim 2, wherein the pre-sintering in step (3) has a temperature of 1100-1200° C.;
wherein, the pre-sintering in step (3) has a heating rate of 1-3° C./min; and
wherein, the pre-sintering in step (3) is carried out for a period of 6-10 h.

17. The preparation method according to claim 2, wherein step (5) further comprises screening the powder with a sieve of 20-60 mesh between the drying and the granulation; and
wherein, step (5) further comprises screening the powder with a sieve of 60-80 mesh after the granulation.

18. The preparation method according to claim 2, wherein a binder is added during the granulation in step (5);
wherein, the binder comprises an aqueous solution of polyvinyl alcohol at a concentration of 9-11 wt %; and
wherein, the binder has an addition amount of 9-12% relative to a mass of the powder.

19. The preparation method according to claim 2, wherein the sintering in step (6) has a temperature of 1370-1410° C.; and wherein, the sintering in step (6) is carried out for a period of 12-18 h.

20. A miniaturized circulator, comprising the microwave ferrite material according to claim 1.

* * * * *